No. 701,340. Patented June 3, 1902.
H. HENRIJEAN & A. PATESSON.
MANUFACTURE OF SPHERICAL MAPS.
(Application filed Nov. 13, 1900.)
(No Model.)
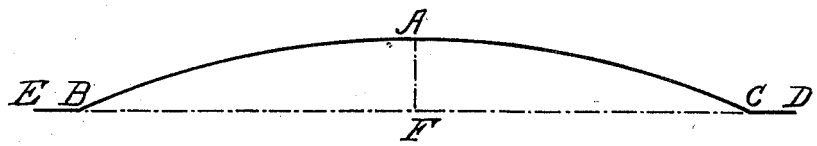
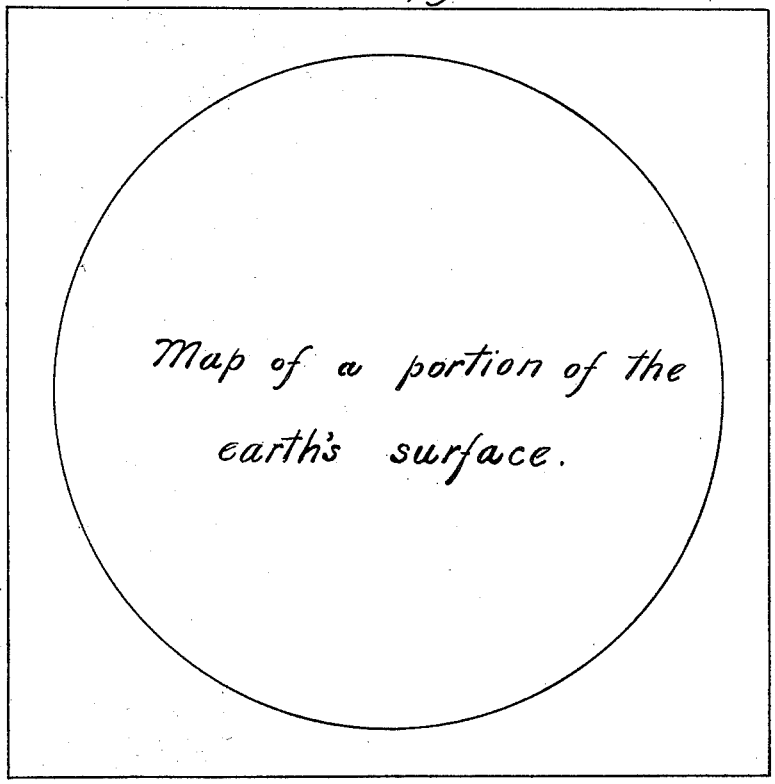
Witnesses:
M. A. Mills.
T. H. Buckhead.
Inventors:
Henri Henrijean & André Patesson.
By Howson & Howson
their Attorneys.

UNITED STATES PATENT OFFICE.

HENRI HENRIJEAN AND ANDRÉ PATESSON, OF BRUSSELS, BELGIUM.

MANUFACTURE OF SPHERICAL MAPS.

SPECIFICATION forming part of Letters Patent No. 701,340, dated June 3, 1902.

Application filed November 13, 1900. Serial No. 36,372. (No model.)

*To all whom it may concern:*

Be it known that we, HENRI HENRIJEAN, residing at 19 Rue des Douze Apôtres, and ANDRÉ PATESSON, residing at 33 Rue d'Espagne, Brussels, Belgium, citizens of the Kingdom of Belgium, have invented a certain new and useful Manufacture of Spherical Maps, (for which we have applied for a patent in the following countries, viz: in Belgium, April 17, 1900, No. 149,265; in Germany, May 19, 1900, and in Austria, May 19, 1900,) of which the following is a specification.

The process to which the present invention relates has for its object to obtain spherical geographical maps by embossing maps printed on flat sheets of metal, such as tin-plate, aluminium, zinc, or the like, or other suitable material, such as celluloid.

In the accompanying drawings, Figure 1 represents a view of the metallic sheet after embossing. Fig. 2 is a view of the same sheet before embossing, and Fig. 3 is a diagrammatic view of a spherical geographic map.

The extent of the segment of the earth which has to be represented being given, also the scale adopted, the versed sine of the curvature and the diameter of the base of the segment are computed mathematically. Thus, for example, on a scale of one-ten-millionth a spherical map having a base of 0.52 meter would have a versed sine of 0.055 meter. Then the changes of form and of angle length and surface are practically valued for the different parts of a flat surface of tin, aluminium, zinc, or other material, such as celluloid, when it is embossed in order to produce the spherical segment having the required versed sine. Again, considering the laws of these changes of form deduced from exact observations, the map is drawn distorted on a flat surface, giving a representation of the countries according to mathematical laws. The drawing is then reproduced on stone or metal—such as steel, copper, or zinc—by known means, and these reproductions serve as matrix for printing. The printing is then made in one or more colors on sheets E B F C D, Fig. 2, of tin, aluminium, or other material capable of being embossed, such as celluloid, and these are heated in a stove in order to fix the colors. This plate is then embossed quite exactly in one or more operations, so as to give it the form of the desired spherical segment, as indicated by B A C, Fig. 1. After this embossing the proportions of the drawing are such that the angles, lengths, and surfaces at all parts of the segment are to scale—that is to say, the segment is a correct reduction to the given scale without the distortion of the portion of the earth's surface which had to be represented.

We claim as our invention—

The herein-described process of constructing a spherical chart of a portion of the earth's surface, consisting of first printing a distorted representation of the chart on a flat surface, then embossing said flat surface so as to produce a surface of a sphere corresponding to the curvature of the earth and causing said distortion to be rectified in the step of embossing to produce a true chart of the said portion of the earth's surface, substantially as described.

In testimony whereof we have hereunto set our hands in presence of two subscribing witnesses.

HENRI HENRIJEAN.
ANDRÉ PATESSON.

Witnesses:
GUSTAVE PIERRE,
EMILE NUYBS.